Patented Dec. 6, 1949

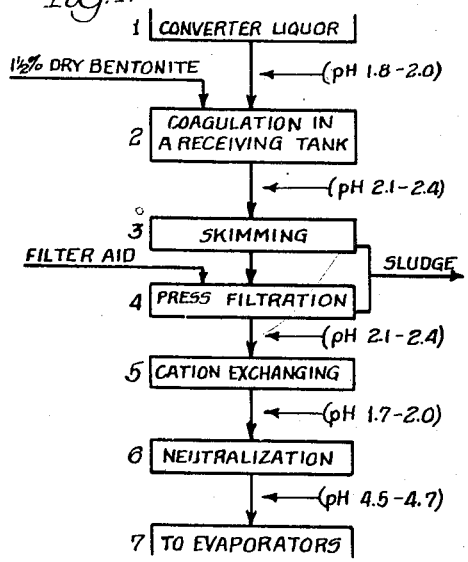
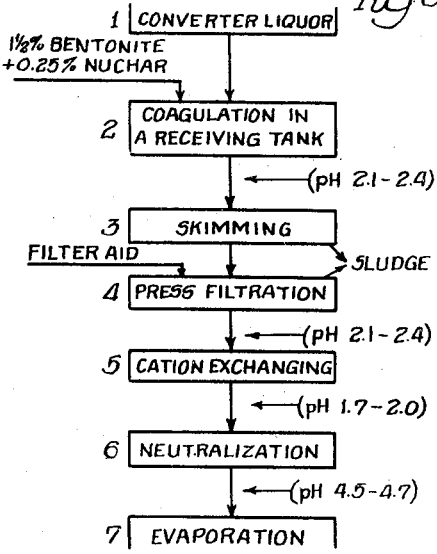
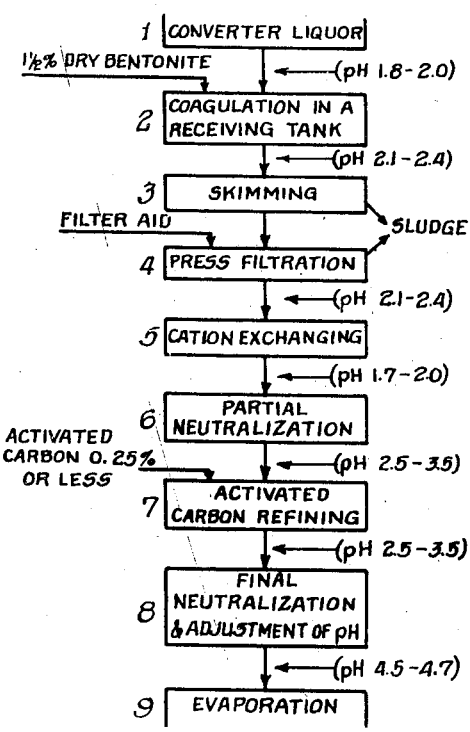
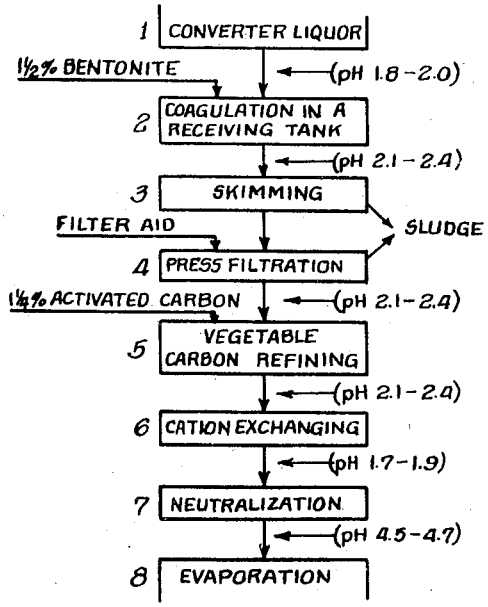

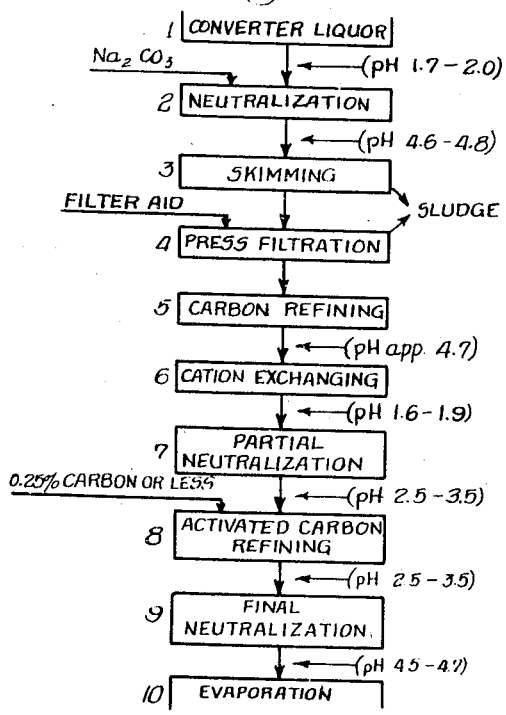
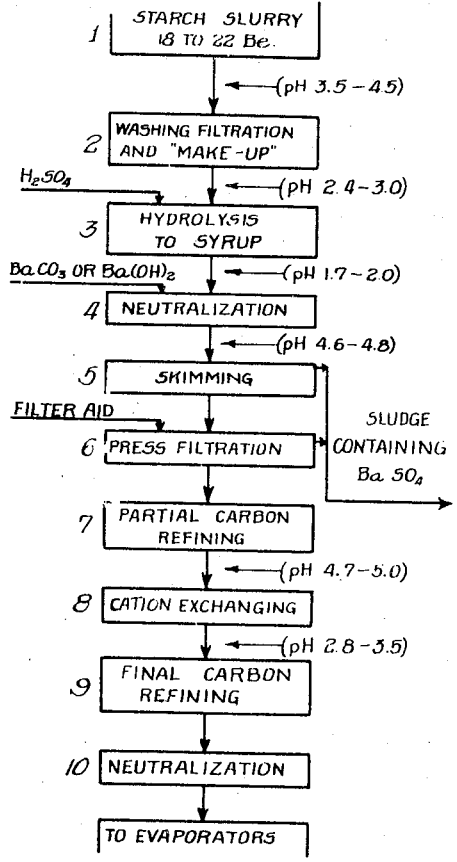
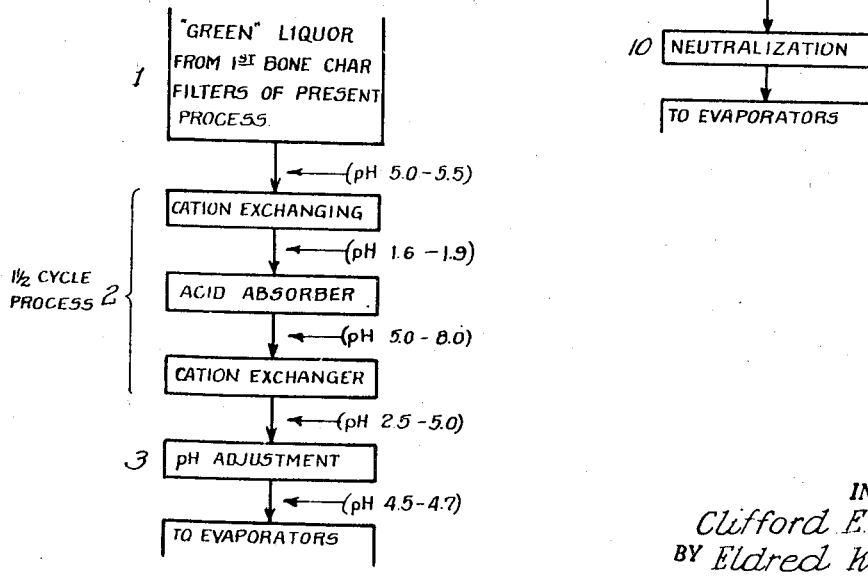

2,490,716

UNITED STATES PATENT OFFICE 2,490,716

PROCESS OF MANUFACTURING STARCH SIRUP

Clifford E. Smith and Eldred K. Olson, Decatur, Ill., assignors to A. E. Staley Manufacturing Co., Decatur, Ill., a corporation of Delaware Application March 30, 1945, Serial No. 585,598

3 Claims. (Cl. 127—46)

The present invention relates to improvements in the manufacture of starch conversion products. More specifically, it has to do with improvements in refining and purifying starch conversion liquors, having particular reference to the treatment of such liquors to provide a syrup which will be stabilized against objectionable color development due to the action of heat or age, and the provision of a process for accomplishing such improvements is a principal object of the invention.

When starch syrup refined by conventional methods is stored for long periods of time, particularly at summer temperatures, or is heated to much higher temperatures for short periods of time, as in the making of candy, it develops an objectionable yellow-red color. The treatment of starch conversion liquor to provide a syrup as described herein comprises a practical process for reducing such color development in starch syrups to values as low as 5 per cent to 10 per cent of those formerly obtained. This marked improvement in color stability is also useful in the preparation of light colored candies from starch syrups.

It is an object of the invention to provide such a syrup from a starch conversion liquor by treating the liquor with a cation exchanger operating on a hydrogen cycle wherein no means are provided for preventing the normal development of low syrup pH during the treatment of the syrup with the cation exchanger.

More specifically, it is an object of the invention to provide such a syrup by the treatment of unneutralized, bentonite clarified converter liquor with a cation exchanger alone; or by treatment of soda ash neutralized, filtered and carbon refined converter liquor with a cation exchanger alone; or by treatment of "green liquor," that is, converter liquor that has been neutralized with soda ash, filtered, and refined by a single pass over bone char, with a cation exchanger alone.

It is also an object of the invention to provide such a syrup from a starch conversion liquor by utilizing a cation exchanger, suitable for the purpose, wherein means are provided for preventing the normal development of low syrup pH during the treatment of the syrup with the cation exchanger.

More specifically, it is an object of the invention to provide such a syrup by the treatment with a cation exchanger alone of a liquor prepared by hydrolyzing starch with sulfuric acid, neutralizing the acid with a barium base, such as barium hydroxide, and filtering; or by the treatment with a cation exchanger alone of a liquor prepared by hydrolyzing starch with a volatile acid anhydride of the type that can be substantially completely separated from water by distillation, such as sulfur dioxide, and subsequently removing the volatile anhydride; or by the treatment with a cation exchanger alone of conventional converter liquor that has been neutralized and clarified simultaneously with such agents as activated carbon, bentonite, lime, and the like.

It is a further object of the invention to provide such a syrup by subjecting starch conversion liquor to the combined action of a suitable cation exchanger and an acid adsorber.

More specifically, it is an object of the invention to provide such a syrup by treatment of a green liquor or its equivalent, first with a cation exchanger, then with an acid adsorber and then again with a cation exchanger; or by treatment of an unneutralized bentonite clarified converter liquor with a cation exchanger, then with an acid adsorber and then again with a cation exchanger; or by treatment of any suitably clarified liquor, first with an acid adsorber and then with a cation exchanger.

Other objects of the invention will be obvious and will in part appear hereinafter.

The invention accordingly comprises the several steps and the relation and order of one or more of such steps with respect to each of the others thereof, which will be exemplified in the process hereinafter disclosed, and the scope of the application of which will be indicated in the claims.

The invention is illustrated in the accompanying flow sheets in which:

Fig. 1 illustrates the application of the invention by refining starch converter liquor with bentonite and a cation exchanger alone;

Fig. 2 illustrates the application of the invention by refining conversion liquor with bentonite, a cation exchanger and carbon;

Fig. 3 illustrates the application of the invention by refining starch conversion liquor with bentonite and an activated carbon mixture followed by a cation exchanger treatment;

Fig. 4 illustrates the application of the invention by refining starch conversion liquor with bentonite, carbon and a cation exchanger in the order named;

Fig. 5 illustrates the application of the invention by refining soda ash neutralized converter liquor with a cation exchanger and activated carbon;

Fig. 6 illustrates an application of the invention for obtaining a high pH effluent from a single cation exchange column operating on a liquor obtained by hydrolyzing starch with dilute sulfuric acid and neutralizing the hydrolyzate with a barium base such as barium carbonate or hydroxide;

Fig. 7 illustrates an application of the invention in which green liquor is treated first with a cation exchanger, second with an acid adsorber, and third with a cation exchanger. The foregoing sequence of treatments is referred to hereafter as a 1½ cycle process;

Figure 8:
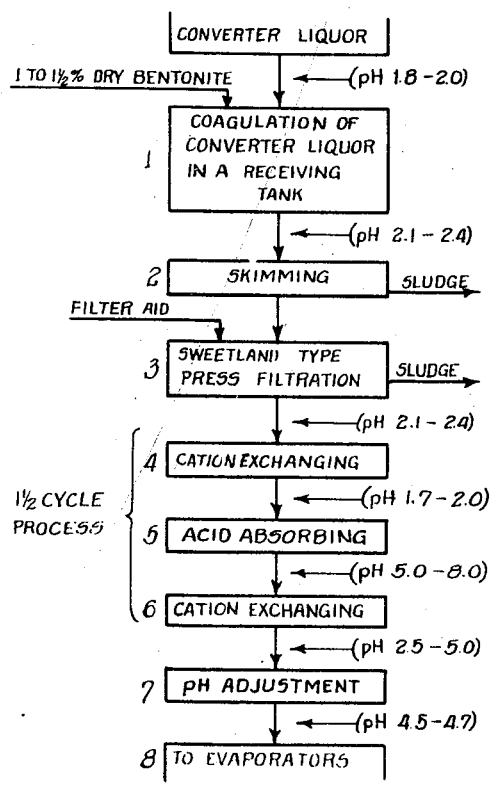
Figure 9:
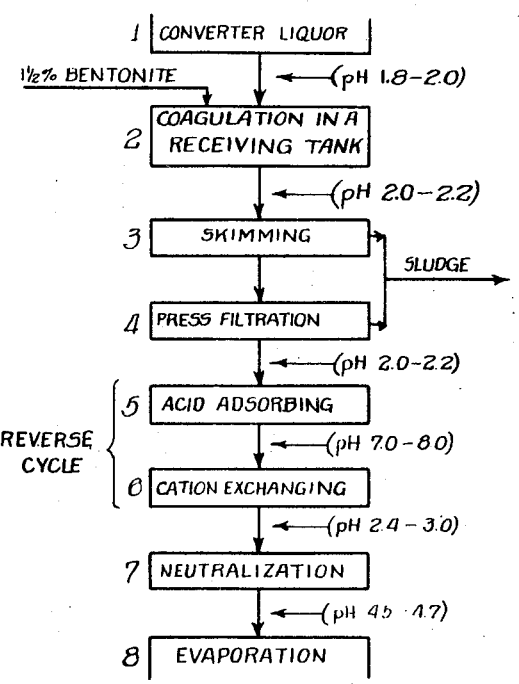

Fig. 8 is the application of the invention to bentonite treated converted liquor by means of the 1½ cycle refining process wherein no form of carbon is used; and Fig. 9 illustrates an application of the invention in which a bentonite clarified unneutralized starch conversion liquor is treated first with an acid adsorber, and second with a cation exchanger. The sequence of operations: treatment with an acid adsorber, treatment with a cation exchanger is referred to hereafter as a reverse cycle process.

The scope of the type of cation exchangers for stabilizing syrup color is limited to the class of cation exchangers that operate on a hydrogen cycle, or are regenerated with acids. The materials that function as acid regenerable cation exchangers are essentially sulfonated organic compounds of very low solubility which may be treated with the mineral acids to form a compound that contains ionizable hydrogen replaceable by metallic cations, or by organic groups which have cationic properties. Examples of commercial materials that are cation exchangers which operate on such a so-called "hydrogen cycle" are readily available from many commercial sources.

Other starch hydrolyzates, such as those from wheat, tapioca, etc., are color-stabilized by the described processes.

As to the scope of the dextrose equivalent of the syrup no limitations have been found, nor are there any limitations because of the dextrose equivalent analysis, believed to exist. Syrups and liquors having a dextrose equivalent analysis of 25 to 90 have been successfully refined and stabilized by following the principles of the present invention.

Successful application of the invention does not require any particular kind of acid adsorber. Any conventional acid adsorbing material of reasonable mechanical strength and heat resistance, and one that does not dissolve in the starch conversion liquor, or impart to it undesirable flavor or odor, will function satisfactorily. Examples of such materials are described in British Patent 495,032 issued November 4, 1938, to I. G. Farbenindustrie; in British Patent 495,401 issued November 14, 1938, to I. G. Farbenindustrie; in British Patent 506,291 issued May 25, 1939, to The Permutit Company, Ltd., and U. S. Patent 2,328,191 issued August 31, 1943, to S. M. Cantor.

Application of the invention is not limited to starch hydrolyzates or conversion liquors obtained by conventional acid hydrolysis of starch. It is applicable to liquors obtained by partially converting starch with acid and then completing the conversion with enzymes as described in U. S. Patent 2,201,609 entitled "Sirup and method of making the same," and granted May 21, 1940, to J. K. Dale and D. P. Langlois. It is also applicable to liquors obtained by converting starch with enzymes only. The enzymes used, alone or in combination with partial acid conversion of the starch, may be of any type that will convert pasted starch to a liquor having a dextrose equivalent of not less than about 25. Malt diastase and the fungus enzymes mentioned in U. S. Patent 2,201,609 are suitable examples for this purpose. Furthermore, the invention is not to be construed as being limited to the treatment of syrup or conversion liquor obtained from starch of any particular degree of purity. By the use of the broad term "starch" we intend to include even very crude starch, especially starch containing relatively high proportions of protein, such as "table tails," and whole cereal grains such as corn, wheat and sorghum.

It should be understood that the inventions embodied by the present disclosure and appended claims are not limited in their applications to starch conversion liquor neutralized with soda ash and that, for example, any sodium base can be used in place of soda ash.

In accordance with the present invention, refined starch syrups of improved resistance to discoloration on heating or aging are obtained by employing a cation exchanger in the refining procedure. The more important teaching of the present invention is, however, that maximum heat and age resistance of the syrup are obtained if the syrup, or its precursor liquor, is treated with a cation exchanger under such conditions that the equilibrium pH of the material during said treatment is not allowed to drop below about 2.4 pH. Since a cation exchanger exchanges hydrogen ion for certain cations (mostly metal cations) the simplest way of preventing production of pH below 2.4 in a liquor in contact with a cation exchanger is to reduce beforehand the exchangeable cation content of the liquor to the extent that even if all the remaining exchangeable cations are replaced by hydrogen ions, the resulting concentration of hydrogen ions will not yield a pH of less than about 2.4. Calculation shows that the maximum permissible concentration of exchangeable cations is about four milliequivalents per liter, i. e., in equivalents per liter not exceeding a value of $[0.004 - \text{antilog}(-\text{pH})]$.

In the conventional acid conversion of starch to yield syrups, a conversion pH as high as 2 is seldom used. Preferably it should be somewhat lower, in the range of 1.7 to 1.9. If the converted liquor containing all the converting acid is neutralized with a base that forms a soluble salt with the acid, and the neutralized liquor is then treated with a cation exchanger, the equilibrium pH of the liquor will drop at least to the conversion pH because all of the conversion acid is regenerated by the cation exchanger. In actual practice, the liquor pH drops below the conversion pH because both starch and water used in the conversion contain appreciable concentrations of soluble inorganic salts that contribute additional acidity when their cations are replaced by hydrogen ions.

Starch syrups have been made by converting starch with dilute aqueous sulfuric acid and neutralizing the acid with a calcium base. A considerable proportion of the sulfate ion introduced by the converting acid is removed from the converted liquor as insoluble calcium sulfate, but some calcium sulfate still remains in solution, causing an objectionable haze in the final concentrated syrup. Such conversion liquors and syrups contain enough dissolved calcium sulfate alone to depress the liquor pH far below 2.4 when they are treated with a cation exchanger.

The solubility of hydrated calcium sulfate in pure water is about 2.2 grams per liter at 100° C. and 2.4 grams per liter at 0° C., or about 27 milliequivalents per liter. Its solubility is appreciably greater than this in concentrated aqueous solutions of polyhydroxy compounds such as glycerine and the products of starch hydrolysis. Were calcium sulfate, present as a saturated solution, the only source of exchangeable cation in a neutral starch conversion liquor, treatment of that liquor with a cation exchanger would lower its pH to that of a solution containing about 30 milliequivalents of hydrogen ion per liter, or about 1.5 pH. In actual practice, owing to soluble inorganic salts present in the original starch and water, the pH falls to even lower values in the range of 1.2 to 1.3.

It is thus apparent that conventional methods do not yield starch conversion liquors whose pH will not pre-exist or fall below 2.4 when treated with a cation exchanger. Treatment of the conventional liquors with a cation exchanger does not impart to the liquors the greatly improved resistance to discoloration on heating or aging that is secured by following the teaching of the present invention.

It is not known definitely why the greatly superior and unexpected improvement in heat and age resistance of a starch conversion liquor is obtained by subjecting the liquor to the action of a cation exchanger under conditions that prevent fall of the equilibrium liquor pH to a value below about 2.4. One possible explanation is that some substance, or group of substances, responsible for the discoloration of the syrup is adsorbed by the cation exchanger preferentially at higher pH values. Possibly that substance, or group of substances, is quite soluble in solutions more acid than that represented by 2.4 pH and has only a relatively weak affinity for a cation exchanger.

EXAMPLE 1

*Treatment of unneutralized, bentonite clarified converter liquor with a cation exchanger alone*

Crude corn starch hydrolyzate of 33 per cent solids and 40 to 45 per cent dextrose equivalent on a dry basis was taken directly from a pressure converter. This material had been converted by means of HCl as a catalyst and still contained this free acid. The pH of this hydrolyzate was about 1.9. This pH is in the range commonly used for such conversions.

On the basis of the solids present, 1 to 1½ per cent Wyoming bentonite clay was added to the hot, crude hydrolyzate. High speed agitation was maintained at a point of addition of the bentonite. Soon after its addition the bentonite coagulated with the undesirable colloidal impurities dispersed in the acid hydrolyzate. The mixture of extraneous material and bentonite was removed together by a process of aerating, skimming and filtration. The resultant syrup filtrate was brilliant and free of color.

The bentonite syrup was percolated through a bed or column of cation exchanger material, operating on a so-called "hydrogen cycle," of such depth that there was a reasonably complete exchange of the base forming cations that were in the syrup for the ionizable hydrogen which was combined with the resin. Under such conditions of ion exchange the pH of the syrup issuing from this step in the process will be as low or lower than the original pH of the crude liquor as it was taken from the converter.

This bentonite syrup makes an ideal feeding stock for refining by means of a cation exchanger column because of the advantage that the syrup as it comes from the bentonite refining step is only partially neutralized (2.1 to 2.3 pH) and thus the metallic adsorbing load is reduced by approximately 50 per cent compared to syrups neutralized to 4.5 to 5.0 pH with soda ash which is the usual procedure. This gives the cation exchanger a much greater capacity for syrup refining before regeneration is necessary. A further advantage resides in the fact that the syrup treated with bentonite is well clarified, that is, it is free of sedimentary and large colloidal materials which would tend to clog the resin in the cation exchanger.

If the syrup effluent from this cation exchanger step, in the above example, is neutralized to 4.5 to 4.7 pH, and evaporated, all as more fully set forth in Fig. 1 hereof, to the common commercial solids range of 75 to 85 per cent solids, the color development of the resulting syrup is reduced to a value which is only 25 to 30 per cent of a control syrup made by refining the same original hydrolyzate with 1½ per cent of an activated carbon such as Nuchar. However, syrup refined as above described has a slight tendency to foam during both evaporation and during candy making, so that we have found it is desirable additionally to refine with a small amount of activated carbon, for example, 0.10 to 0.25 per cent on the basis of the solids content of the syrup. The carbon refining removes the materials that cause foaming but has no material effect upon the color resistance value of the syrup.

We have found that the carbon refining step may be brought into the process at any one of several points in the scheme of operations. Thus, referring to Fig. 3, the carbon dose may be added with the bentonite to the crude acid hydrolyzate. It may be added to the skimmer to be removed by subsequent skimming and filtration; it may be used after press filtration and before cation exchange; it may be used after cation exchange and before neutralization; it may be used after neutralization and before evaporation; or, at an intermediate stage in the evaporation, for example, 55 to 60 per cent solids. The carbon may be used under several pH conditions, thus obtaining a better use of the carbon than if it were used under one pH condition alone.

Bentonite works best as a clarifier when used under the acid conditions herein described but unless a cation exchanger column is used in the refining system following the bentonite refining step, the resulting syrup will become very cloudy as a result of the exchange of metallic ions for hydrogen in the partial neutralization reaction. It has heretofore been impractical to use bentonite satisfactorily as a clarifier for strongly acidic starch hydrolyzates because of this cloud producing effect. However, it is practical to use bentonite as a refining agent for syrup, as herein described, in conjunction with an ion exchanger. (See also Figs. 2 and 4.)

By the utilization of bentonite, an inexpensive mineral material, ahead of a cation exchanger, it can be utilized as a refining agent to replace a large part, or substantially all, of the much more expensive carbon commonly used as a clarifying and refining agent for syrup.

The above described process illustrates that the bentonite-cation exchanger may be applied to crude, unneutralized hydrolyzates with the following advantages:

a. The production of a clarified, color resistant syrup, free of haze development on standing, by an economical process.

b. The use of the bentonite, as above described, permits the cation exchanger to operate for longer periods without regeneration.

EXAMPLE 2

*Treatment of soda ash neutralized, filtered, and carbon refined converter liquor with a cation exchanger alone*

Converter liquor as described in Example 1 was neutralized with soda ash to a pH in the range of about 4.5 to 5.0. This is the iso-electric range for most of the colloidal non-saccharide materials in corn starch hydrolyzates, and thus is the condition of best flocculation of these impurities. Neutralization to this pH range is standard practice in the industry in preparation of the liquor for primary filtration to remove these materials.

The neutralized and filtered liquor was refined with 0.25 to 0.75 per cent of an activated carbon material such as Nuchar to produce a well clarified liquor as a feed for the cation exchanger. The same carbon could have been previously used to finally refine the syrup in this process and thus would be used before the cation exchange action as the final step in the usual counter current method of employing carbon as a refining agent.

The liquor from the first carbon refining step, converted at 1.8 to 1.9 pH, was then percolated through a bed of cation exchanger (Zeo Karb H). The pH of the effluent liquor was 1.5 to 1.7. The increase in acidity over that present during conversion was due to generation of additional acid by removal of cations from ionizable salts which accompanied the starch.

As the next step, the syrup was partially neutralized to around 3 to 4 pH, and put through a carbon refining step before final evaporation. It may also be neutralized, if desired, to the more conventional range of 4.5 to 5.0 for carbon refining. In either case the syrup is adjusted to a pH of 4.5 to 5.0 and evaporated to the usual solids content. (See Fig. 5.)

The foregoing example is another illustration of the use of the cation exchanger to largely replace vegetable carbon in the refining of corn syrup. Not only does the action of the cation exchanger greatly reduce the amount of carbon necessary in syrup refining, but the product is much more color resistant than can be obtained with the use of even extravagant amounts of vegetable carbon.

EXAMPLE 3

*Treatment of "green" liquor with cation exchanger alone*

Light liquor (16 to 20 Baumé) from the first filtration (green liquor) step of corn syrup refinery using the conventional three filtration steps of a bone char process was percolated through a cation exchanger column as described in Examples 1 and 2. The effluent from the column was neutralized to 5.0 pH and evaporated to 43 Baumé (approximately 80 per cent solids).

The resulting syrup was very satisfactorily refined from all points of view and the color development was only about 20 per cent of the normal color development shown by a syrup refined by all three filtration steps of a typical bone char process.

EXAMPLE 4

*Treatment with cation exchanger alone of a liquor prepared by hydrolyzing starch with sulfuric acid, neutralizing the acid with barium hydroxide, and filtering*

Sulfuric acid was used as the converting acid and neutralized, after satisfactory hydrolysis had been obtained, with barium hydroxide (any suitable barium base, including barium carbonate, may also be used). As the result of the use of this neutralizer practically all sulfate ions added as acid as well as those accompanying the starch were precipitated as the very insoluble $BaSO_4$. When the clarified liquor from this process was percolated through the cation exchanging columns very little acidity was generated. The pH of the cation exchanger effluent in one pass was 2.5 which indicates an amount of active acidity in the order of 15 per cent of the normal acidity of the effluent under the conditions described in Examples 1, 2 and 3. The elimination of the major portion of the mineral acid in the syrup allowed the column to function much more efficiently as a syrup refining agent. (See Fig. 6.)

We have found that the efficacy of an organic cation exchanger can still be further improved by adjusting conditions so that the equilibrium pH of the effluent syrup in the column is held at a higher level than in the preceding Examples 1, 2 and 3, in which the pH of the effluent syrup was in the order of 1.5 to 1.8. The process set forth in Example 4 has proven to be very efficient in removing the cause of color formation from starch syrup hydrolyzates.

EXAMPLE 5

*Treatment with cation exchanger alone of a liquor prepared by hydrolyzing starch with a volatile acid anhydride, such as sulfur dioxide, and subsequently removing the volatile anhydride*

A volatile anhydride, such as sulfur dioxide, was used to convert starch under pressure with the advantage that the anion content of the hydrolyzate was greatly reduced by release of pressure, aeration, and boiling at reduced pressure.

The sulfur dioxide under pressure was applied to a steam heated autoclave containing the priming water. Heavy starch slurry was forced into the autoclave at a rate such that the condition of the paste continued to exist at all times. Steam and sulfur dioxide pressure were maintained on the autoclave until the desired degree of hydrolysis was attained.

Acidity of the hydrolyzate was reduced by "flash off" when the pressure was released from the autoclave. The sulfur dioxide content can be further lessened by applying reduced pressure (vacuum) and by aeration.

The hydrolyzate was then clarified. (Any of the clarifying steps described in the foregoing examples can be used.) Final refining for color stability was accomplished by the use of a cation exchanger column.

EXAMPLE 6

*Treatment of a "green" liquor, or its equivalent, first with a cation exchanger, then an acid adsorber, and then again with a cation exchanger (1½ cycle process)*

Another way to obtain a light starch syrup low in salt content which, therefore, will not generate a low pH condition in passing through a hydrogen exchanging cation exchanger was to first demineralize clarified, i. e. first filtration light liquor from a bone char process (green liquor), liquor by putting it through a demineralizing system consisting of a column cation exchanger and then an acid adsorbing resin.

Percolation of the neutral, demineralized liquor from the combined ion and acid adsorbing exchange steps, and then through another cation exchanger produced an effluent syrup with a pH ranging from 3 to 4. The maintenance of such a desirably high pH range depends upon the efficient operations of both preceding ion exchange treatments.

This 1½ cycle produced a syrup with extreme resistance to color development. The color formation in syrup refined by this process was only 5 per cent or less of the color developed in syrup refined by conventional activated carbon or bone char methods. (See Fig. 7.)

The first step in this three step ion exchange process operates in the same way as the single column ion exchange refining system described in Examples 2 and 3 (see Figs. 1 through 5, i. e., a clarified liquor is percolated through a cation exchanger). The same advantages are obtained.

In passing through the second step in the process, the acid adsorbing step, an additional refining action takes place. However, extreme resistance to color is attained after the light syrup liquor is percolated through the second cation exchanger column, or third step, under conditions of relatively low acidity.

In terms of yellow Lovibond units the color development shown after 3 hours at 212° F. by syrup samples obtained from each of the three steps of this ion exchange system would be typically as follows:

1st cation exchanger_____ 6.0 y
Acid adsorber_____ 3.5 y
2nd cation exchanger_____ 1.0 y A corresponding result for syrup refined by the active carbon or bone char method would be 25 y.

EXAMPLE 7

*Treatment of an unneutralized, bentonite clarified converter liquor with a 1½ cycle process*

A bentonite clarified converter liquor prepared according to the modification described in Example 1 made an excellent feeding stock for the resin process refining system described in Example 6, (see Fig. 8), our "1½ cycle" process.

This bentonite clarified converter liquor, after being subjected to a cation exchanger, an acid adsorber and then a cation exchanger (1½ cycle), without the use of any form of an activated carbon as a refining agent, produced an excellent refined syrup. Color resistance tests on syrups made by this combination have been better even than those mentioned in connection with preceding Example 6. One syrup made by this process had a color, after 3 hour heat punishment, of only 0.4 y. (See Fig. 8.)

EXAMPLE 8

*Treatment of any suitably clarified liquor, first with an acid adsorber, and then with a cation exchanger*

An unneutralized converter liquor was defecated with bentonite, yielding a clear partially neutralized liquor carrying only about one-half of the metallic cation content of converter liquor neutralized to the flocculation point (4.5 to 5.0 pH) with soda ash. The defecated liquor was then percolated first through a bed of acid adsorber, and second through a bed of cation exchanger. (See Fig. 9.)

The above described process has at least two operating advantages over that described in connection with Example 7.

1. The first cation adsorbing column can be eliminated.
2. The ion-exchanging load (and thus the amount of regeneration required) for both adsorbers will be much less than in a demineralizing system (a cation exchanger-acid adsorber) fed with neutralized liquor. This lessened load and the practicality of placing the exchangers in this order to attain a condition of low acidity in the cation exchanger largely depend upon the fact that bentonite clarified liquor is only partly neutralized.

Data on color development in the three hour heat test are collected in the following table. Unless otherwise specified, all of the syrups were made from starch converted with hydrochloric acid. The control syrup was made by converting starch with hydrochloric acid, neutralizing the converted liquor with soda ash to about 4.7 pH, filtering, decolorizing with 1½ per cent of activated carbon based on dry substance in the liquor, and evaporating to the desired density. In the table, the term "BCUCL" refers to bentonite - clarified - unneutralized - converted-liquor, "CE" to cation exchanger, "AA" to acid adsorber, "green liquor" to an HCl-starch hydrolyzate that has been neutralized to about 4.7 pH with soda ash, filtered, and treated with bone char, "$H_2SO_4$-Ba liquor" refers to a liquor made by converting starch with dilute sulfuric acid, exactly neutralizing the sulfuric acid with a barium base, filtering, treating with 1½ per cent activated carbon and again filtering, and the "+" sign means "then treated with."

| | Kind of Syrup | Color Development after 3 hour heat test |
|---|---|---|
| 1 | Control | 25.0 y, 4.8 r |
| 2 | Control+CE | 5.5 y, 1.0 r |
| 3 | Control+CE+AA | 2.7 y, 0.5 r |
| 4 | Control+CE+AA+CE | 0.5 y, 0.1 r |
| 5 | Green liquor | 50.0 y, 9.6 r |
| 6 | Green liquor+CE | 6.0 y, 1.2 r |
| 7 | Green liquor+CE+AA | 3.5 y, 0.7 r |
| 8 | Green liquor+CE+AA+CE | 1.0 y, 0.2 r |
| 9 | BCUCL+CE | 6.5 y, 1.3 r |
| 10 | BCUCL+CE+AA+CE | 0.4 y, or |
| 11 | BCUCL+AA+CE | 3.6 y, 0.8 r |
| 12 | $H_2SO_4$-Ba liquor | 24.5 y, 4.5 r |
| 13 | $H_2SO_4$-Ba liquor+CE | 2.5 y, 0.4 r |

Prolonged contact of liquid with excess cation exchanger (No. 2 of the foregoing list) as in the first step of the 1½ cycle process (see No. 4), does not yield the high color stability that is obtained by the 1½ cycle process (compare No. 2 with No. 4). Neither does prolonged contact of liquor with excess cation exchanger followed by prolonged contact with excess acid adsorber (No. 3), as in the first two steps of the 1½ cycle process, secure the high color stability of the 1½ cycle process (compare No. 3 with No. 4). This shows that the last step of the 1½ cycle process accomplishes more, with respect to improving color stability of the liquor, than can be accomplished simply by repeating the first step without an intermediate treatment of the liquor with an acid adsorber.

EXAMPLE 9

*Application of the 1½ cycle process to a starch conversion liquor obtained by converting starch first with acid then with enzyme*

Undecolorized liquor from the enzyme conversion step of the process described in U. S. Patent 2,201,609 is percolated first through a bed of cation exchanger, second through a bed of acid adsorber (with prior cooling to about 100° F. if necessary); and third through another bed of cation exchanger. The effluent from the second cation exchanger treatment was wholly decolorized and developed a color of only 1.0 to 1.5 y and 0.2 to 0.3 r, respectively, when held at 212° F. for 3 hours. Without any treatment by the ion exchange materials, the liquor developed a color in the neighborhood of 50 y and 10 r when heated for 3 hours at 212° F.

EXAMPLE 10

*Application of the 1½ cycle process to a starch conversion liquor obtained by converting starch with enzyme alone*

One part of starch was slurried with four parts of water and 0.002 part of a purified fungus enzyme preparation of the kind described in U. S. Patent 2,201,609. The slurry was slowly heated with agitation to the pasting temperature of the starch. The resulting paste was cooled to 130° F., treated with 0.008 part more of the purified enzyme preparation, and held at 130° F. for 16 hours. This treatment converted the starch paste to a thin light yellow liquor having a dextrose equivalent analysis of 45 to 50. The conversion liquor was mixed with some filter aid and 2 per cent of activated carbon based on the starch and filtered. The nearly colorless filtrate was percolated first through a bed of cation exchanger, second through a bed of acid adsorber, and third through another bed of cation exchanger. The final liquor was wholly decolorized and developed a color of 1.0 to 1.5 y and 0.2 to 0.3 r, respectively, when heated at 212° F. for 3 hours. Without any treatment by the ion exchange materials, the liquor developed a color in the neighborhood of 75 y and 15 r during the 3 hour heat test.

By the term "equilibrium pH" used heretofore and in certain of the following claims is meant that pH of the liquor that is not changed when it is brought into contact with a substantial quantity of fresh ion exchanger. If the liquor is being treated with a cation exchanger its pH is at equilibrium when there are no more cations in the liquor that will be adsorbed by fresh cation exchanger from the liquor as it now is.

Such expressions as "treated with" and "subjected to the action of" with reference to ion exchangers, as used heretofore and in certain of the following claims, refer to treatments or actions in which the pH of the treated liquor reaches substantially equilibrium value as defined above.

We claim:

1. In the manufacture of syrup from starch, the improvement which consists of separately treating a starch conversion liquor with a cation exchanger operating on a hydrogen cycle, then with an acid adsorber, and then as a final ion exchange step with a cation exchanger operating on a hydrogen cycle, whereby the equilibrium pH of the liquor during the second cation exchanger treatment is prevented from falling below a value of about 2.4.

2. In the manufacture of syrup from starch, the improvement which comprises separately treating a green liquor with a cation exchanger operating on a hydrogen cycle, then with an acid adsorber, and then as a final ion exchange step with a cation exchanger operating on a hydrogen cycle, whereby the equilibrium pH of the liquor during the second cation exchanger treatment is prevented from falling below a value of about 2.4.

3. In the manufacture of syrup by converting starch first with acid, then with an enzyme, the improvement comprising separately treating a starch conversion liquor with a cation exchanger operating on a hydrogen cycle, then with an acid adsorber, and then as a final ion exchange step with a cation exchanger operating on a hydrogen cycle, whereby the equilibrium pH of the liquor during the second cation exchanger treatment is prevented from falling below a value of about 2.4.

CLIFFORD E. SMITH.
ELDRED K. OLSON.

REFERENCES CITED

The following references are of record in the file of this patent:

UNITED STATES PATENTS

| Number | Name | Date |
|---|---|---|
| 2,155,318 | Liebknecht | Apr. 18, 1939 |
| 2,191,365 | Boyd | Feb. 20, 1940 |
| 2,319,648 | Walsh | May 18, 1943 |
| 2,319,649 | Walsh | May 18, 1943 |
| 2,328,191 | Cantor | Aug. 31, 1943 |
| 2,330,785 | Walsh | Sept. 28, 1943 |
| 2,332,758 | Schopmeyer | Oct. 26, 1943 |
| 2,372,233 | Thurston | Mar. 27, 1945 |
| 2,388,222 | Behrman | Oct. 30, 1945 |
| 2,388,223 | Behrman | Oct. 30, 1945 |
| 2,389,119 | Cantor | Nov. 20, 1945 |
| 2,413,676 | Behrman | Jan. 7, 1947 |

FOREIGN PATENTS

| Number | Country | Date |
|---|---|---|
| 805,092 | France | Aug. 17, 1936 |
| 509,710 | Great Britain | July 19, 1939 |
| 116,691 | Australia | Mar. 25, 1943 |

OTHER REFERENCES 359,575, Smit (A. P. C.), published May 11, 1943.